Feb. 24, 1942.  H. P. FISHER  2,274,323
SEALING GASKET
Filed Nov. 29, 1939
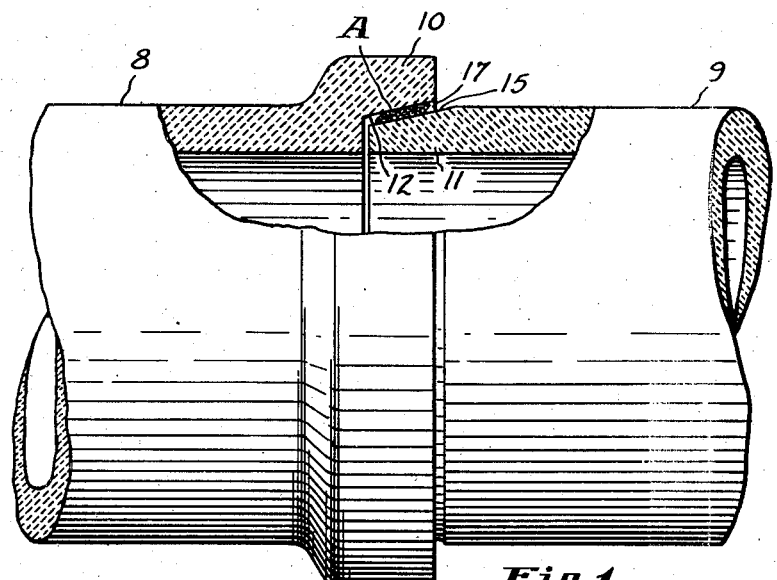
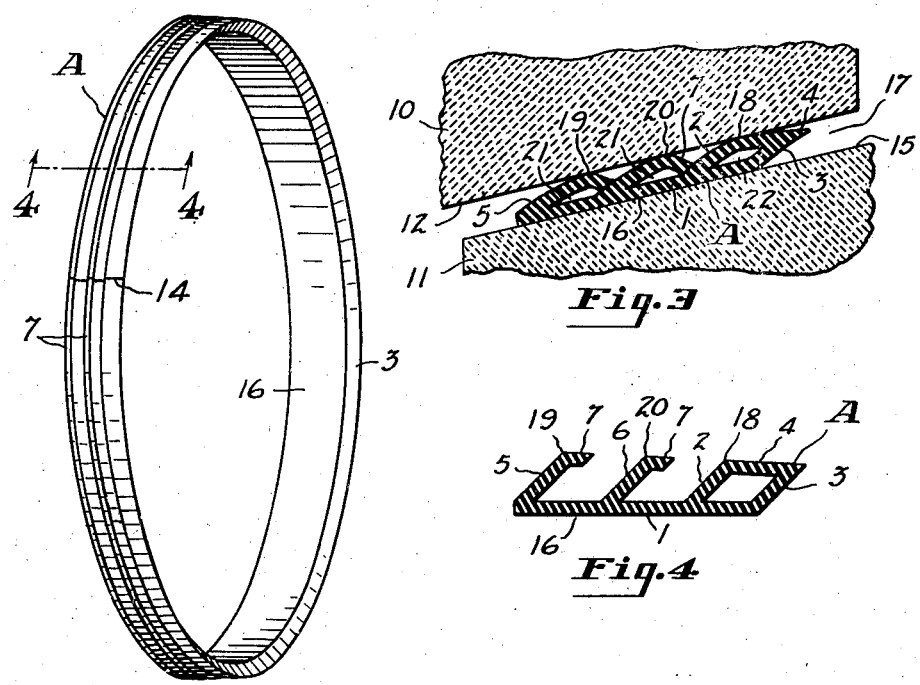
Fig.1
Fig.2
Fig.3
Fig.4
INVENTOR
Harry P. Fisher
BY
Evans & McCoy
ATTORNEYS Patented Feb. 24, 1942

2,274,323

UNITED STATES PATENT OFFICE 2,274,323

SEALING GASKET

Harry P. Fisher, Wabash, Ind., assignor to The General Tire & Rubber Company, Akron, Ohio, a corporation of Ohio Application November 29, 1939, Serial No. 306,664

3 Claims. (Cl. 288—19)

This invention relates to sealing gaskets, and more particularly to resilient gaskets for establishing a fluid-tight seal between the ends of pipe sections.

It is an object of the invention to provide a pipe sealing gasket which may be quickly and easily assembled in the pipe joint and which when in place affords a yieldable resilient seal that effectively resists the passage of liquids and gases into or out of the pipe at the joint.

Another object is to provide a pipe sealing gasket or the like of a resilient plastic material, such as rubber, which through its inherent elastic properties maintains the fluid seal between the pipe sections.

More specifically, the invention aims to provide a gasket of the character described which, although having portions cut away or removed so as to be of less thickness than the space to be sealed, is adapted to effectively fill such space and maintain itself in resilient engagement with the pipe ends.

Another object is to provide a sealing gasket, particularly for use in telescopically assembled pipe joints, which is relatively simple in design and construction and may be inexpensively manufactured in quantities as well as being adapted for assembly by unskilled workmen without special training or experience. Other objects and advantages will become apparent from a consideration of the following detailed description of a suitable embodiment of the invention which is made in connection with the accompanying drawing, in which:

Figure 1 is a fragmentary view partly in section and shows my improved gasket disposed in the space between the ends of pipe sections assembled in a telescopic joint;

Fig. 2 is a perspective view of the gasket in its normal or unstressed shape;

Fig. 3 is a fragmentary detail in section showing the shape of the gasket when the same is under compression between the opposed faces of the pipe sections; and Fig. 4 is a sectional detail of the gasket taken substantially on the line 4—4 of Fig. 2.

The gasket comprises a relatively thin flat body strip 1, preferably formed of an elastic material such as rubber which may have a consistency corresponding to that customarily employed in the manufacture of pneumatic vehicle tires. Along one edge of the body strip 1 is formed a tubular cushion of generally rectangular shape in cross section. This cushion has side wall portions 2 and 3 which extend laterally from one side of the strip 1 and are connected to one another along their outer edges by pressure or sealing wall 4 which is normally disposed in spaced substantially parallel relation to the edge portion of the body strip 1 between the walls 2 and 3 of the cushion.

Along the other or opposite edge of the body strip 1 is a first L shaped sealing element including an approximately planar portion or flange 5 which extends laterally from the strip 1 at an oblique angle and is disposed on the same side of the strip as the tubular cushion.

Intermediate the edge flange 5 and tubular cushion is an intermediate or second L shaped sealing element including an approximately planar portion or flange 6 which is formed in parallel relation to the flange 5 and extends laterally from the body strip 1 in the same direction as the edge flange and the side walls of the tubular cushion. Desirably, the flanges 5 and 6, as well as the walls of the tubular cushion, are integral with the body strip 1, and the whole strip may be formed as a unit by a suitable process such as extrusion.

Along the free edges of the laterally extending portions or flanges 5 and 6 are approximately planar portions or lips 7 which are turned or extended toward the tubular cushion. The flange 6 is wider than the tubular cushion, so that the lip 7 thereof extends beyond the plane of the sealing portion 4 and the flange 5 in turn is wider than the flange 6. Thus the strip is provided with successive lateral extensions or sealing elements of progressively increasing width, the narrow extension or sealing portion being of greater rigidity or strength than the wider sealing portions or extensions.

The gasket or sealing strip having a cross sectional form of the character just described is measured to length and the ends thereof joined by vulcanization or otherwise to form an annulus, such as that shown in Fig. 2. This annulus is then assembled in a pipe joint, such as that shown in Fig. 1. Succeeding pipe sections indicated at 8 and 9 are provided with bell and spigot ends 10 and 11, respectively. The bell 10 has an annular inwardly directed face 12 which is formed in its open end, while the spigot end 11 has an outwardly directed annular face 15. A sealing gasket such as that shown in Fig. 2 is placed around the spigot 11 of one of the pipe sections, being received on the face 15 so that sealing face 16 of one side of the body strip 1 is disposed flatwise against the spigot face 15. Preferably, the gasket is normally of less diameter than the spigot 11 so that in placing the annulus around the spigot the rubber is somewhat stretched and the inherent elasticity of the gasket retains the same on the spigot end of the pipe while the latter is moved or shifted about. As shown in Figs. 1 and 3, the gasket is arranged on the spigot so that the laterally extending flange 5 is outermost and is the first part of the gasket received within the bell 10.

The pipe joint is then assembled, a suitable lubricant such as water or glycerine being applied over the gasket or within the bell to facilitate the insertion of the spigot. As shown in Fig. 1, the annular surfaces 12 and 15 are tapered so that annular space 17 between the bell and spigot is progressively diminished during the assembling operation.

The inwardly directed surface 12 of the bell first engages the circumferentially extending outer edge of the flange 5, forcing the flange toward the body strip 1 as the movement of the spigot into the bell is continued. The flange 6 and the tubular cushion are then engaged by the surface 12 of the bell in the order named and likewise are forced toward the body strip 1 of the gasket by the pressure of the bell. This pressure flattens the tubular cushion and distorts the same so that corner 18 formed by the side wall 2 and pressure face 4 effects a line contact seal with the inwardly directed face 12 of the bell. Similarly, corners 19 and 20 formed along the edges of the L shaped sealing elements by the intersecting lip portions 7 and the flanges 5 and 6, respectively, make circumferentially extending line sealing contact with the face 12, as shown in Fig. 3.

The distance between the flange 6 and the side wall 2 of the tubular cushion is less than the width of the flange, so that when the latter is deformed or depressed toward the body strip 1, the lip 7 thereof engages the cushion wall 2 so as to be supported thereby. Similarly, the distance between the flange 5 and the flange 6 is less than the width of the flange 5, so that when the latter is deformed in assembling the pipe joint, the lip 7 of the flange rests against the base of the flange 6. In this manner both the flanges 5 and 6 are supported along their outer edges when assembled so as to form circumferentially extending air chambers 21, which are disposed between the flanges and closed portions of the body strip 1. Thus when the gasket is assembled in a pipe joint connection, the sealing effect of the edges of the lips 7 against the portions of the gasket with which they are in contact, form the supplementary air chambers or pockets 21 in which air may be trapped to assist circumferential air chamber 22 of the tubular cushion in maintaining the fluid-tight seal between the ends of the pipe sections.

As shown in Fig. 4, the flanges 5 and 6 may be disposed in approximately parallel relation to the side walls 2 and 3 of the tubular cushion. The angle between the laterally extending flanges, such as the flanges 5 and 6, and the body strip 1, is not critical. It has been found, however, that an angle such as about 30° to 60°, preferably about 45°, as shown in Fig. 4, is satisfactory.

The principles of the present invention may be utilized in various ways, numerous modifications and alterations being contemplated, substitution of parts and changes in construction being resorted to as desired, it being understood that the embodiment shown in the drawing and described above is given merely for purposes of explanation and illustration without intending to limit the scope of the claims to the specific details disclosed.

What I claim is:

1. A sealing gasket for pipe sections comprising a relatively thin elongated strip of resilient material having an integral longitudinally extending cushion portion on one side thereof, and a resilient sealing element L shaped in cross section secured by one edge thereof to the strip along a portion of the latter spaced from the cushion portion, said element having approximately planar intersecting portions providing a longitudinally extending edge corner normally spaced from the strip, one of said planar portions normally extending from the other planar portion toward the cushion portion and in overlying relation to a portion of the strip between the cushion portion and the sealing element whereby in confining the gasket between spaced surfaces to effect a seal therebetween the sealing element is bent toward the cushion portion, the edge corner making a line contact seal with one of the spaced surfaces and said one planar portion abutting edgewise against the cushion portion.

2. A sealing gasket for pipe sections comprising a relatively thin elongated strip of resilient material having an integral longitudinally extending cushion portion on one side thereof, and a pair of resilient sealing elements each L shaped in cross section and each secured by one end thereof to the strip, said elements being disposed in approximately parallel spaced relation to one another and to the cushion portion and each having approximately planar intersecting portions providing a longitudinally extending edge corner normally spaced from the strip, one of said planar portions of each of the sealing elements normally extending from the other planar portion thereof toward the cushion portion and in overlying relation to a portion of the strip between the secured edge of the sealing element and the cushion portion whereby in confining the gasket between spaced surfaces to effect a seal therebetween the sealing elements are bent toward the cushion portion, the edge corners making line contact seals with one of the spaced surfaces, and said one planar portion of one of the sealing elements abutting edgewise against the cushion portion.

3. A sealing gasket for pipe sections comprising a relatively thin elongated strip of resilient material having an integral longitudinally extending cushion portion on one side thereof, and a pair of resilient sealing elements each L shaped in cross section and each secured by one edge thereof to the strip, a first one of said elements being disposed in approximately parallel spaced relation to the cushion portion and the other of said elements being disposed intermediate said one element and the cushion portion, said elements each having approximately planar intersecting portions providing a longitudinally extending edge corner normally spaced from the strip, the edge corner of said one element being spaced further from the strip than the edge corner of the intermediate element, one of said planar portions of each of the sealing elements normally extending from the other planar portion thereof toward the cushion portion and in overlying relation to a portion of the strip between the secured edge of the sealing element and the cushion portion whereby in confining the gasket between spaced surfaces to effect a seal therebetween the sealing elements are bent toward the cushion portion, the edge corners making line contact seals with one of the spaced surfaces, and said one planar portion of the intermediate element abutting edgewise against the cushion portion and said one planar portion of the first sealing element abutting edgewise against the intermediate element.

HARRY P. FISHER.